United States Patent
Macomber et al.

(10) Patent No.: US 11,587,053 B1
(45) Date of Patent: Feb. 21, 2023

(54) SYSTEM AND METHOD FOR FACILITATING ACCOUNT PROVISIONING

(71) Applicant: Capital One Services, LLC, McLean, VA (US)

(72) Inventors: Jackson Macomber, Henrico, VA (US); Kevin Osborn, Newton Highlands, MA (US); Jeffrey Rule, Chevy Chase, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/740,947

(22) Filed: May 10, 2022

(51) Int. Cl.
*G06Q 20/10* (2012.01)
*G06Q 20/40* (2012.01)

(52) U.S. Cl.
CPC ....... *G06Q 20/105* (2013.01); *G06Q 20/4014* (2013.01)

(58) Field of Classification Search
CPC .................. G06Q 20/105; G06Q 20/4014
See application file for complete search history.

(56) References Cited

U.S. PATENT DOCUMENTS

| | | |
|---|---|---|
| 7,146,159 B1 | 12/2006 | Zhu |
| 10,346,848 B2 | 6/2019 | Ziat et al. |
| 10,461,933 B2 | 10/2019 | Le Saint et al. |
| 10,664,824 B2 | 5/2020 | Wong et al. |
| 11,087,328 B2 | 8/2021 | Carpenter et al. |
| 11,126,635 B2 * | 9/2021 | Thexton et al. ...... G06F 16/283 |
| 11,201,743 B2 | 12/2021 | Le Saint et al. |
| 2017/0353353 A1 * | 12/2017 | Nicholas ............. H04L 41/0803 |

(Continued)

FOREIGN PATENT DOCUMENTS

| | | | | |
|---|---|---|---|---|
| GB | 2597581 | * | 2/2022 | ............. G06Q 20/32 |
| WO | 2012/126753 | | 8/2012 | |

(Continued)

OTHER PUBLICATIONS

Joshi, S.: What isUser Provisioning? All You Need to Know in One Place, Jan. 10, 2022, pp. 1-21 (Year: 2022).*

(Continued)

*Primary Examiner* — Bijendra K Shrestha
(74) *Attorney, Agent, or Firm* — Hunton Andrews Kurth LLP

(57) ABSTRACT

In a method for broadcasting account provisioning information, user datum encryption information is transmitted to a plurality of account processing systems. A request to share account provisioning information is received from a user device associated with an account holder. A user datum of the account holder is encrypted using the encryption information and transmitted to the account processing systems. A response is received from at least one of the account processing systems, the response including an indication that the account holder has a transaction account processed by that account processing system. A request for confirmation that the account provisioning information should be shared is sent to the user device and a confirmation response is received from the user device that includes permission to share account provisioning information. Account provisioning information is then transmitted to one or more of the account processing systems.

20 Claims, 7 Drawing Sheets

(56) References Cited

U.S. PATENT DOCUMENTS

| | | |
|---|---|---|
| 2019/0122212 A1 | 4/2019 | Huxham et al. |
| 2019/0213578 A1 | 7/2019 | Reijkens |
| 2020/0097960 A1 | 3/2020 | Wong et al. |
| 2021/0150616 A1 | 5/2021 | Kentris et al. |

FOREIGN PATENT DOCUMENTS

| | | | |
|---|---|---|---|
| WO | 2013/157797 | 10/2013 | |
| WO | WO-2017120605 A1 * | 7/2017 | ......... H04L 63/0853 |
| WO | WO-2019094488 A1 * | 5/2019 | ........... G06Q 20/322 |

OTHER PUBLICATIONS

Nils: The push provisioning conceptb-how to push card to mobile wallets, merchants and weables, Feb. 18, 2021, MeaWallet, pp. 1-6. (Year: 2021).*

Mastercard: MDES Token Connect-Token Requester Implementation Guide and Specifications, Dec. 21, 2021, pp. 1-74 (Year: 2021).*

* cited by examiner

SYSTEM AND METHOD FOR FACILITATING ACCOUNT PROVISIONING

FIELD OF THE INVENTION

This disclosure relates generally to systems and automated methods for user account provisioning and, more particularly to an automated system and method for broadcasting provisioning information to multiple account processing systems.

BACKGROUND OF THE INVENTION

There are many instances where a user having a primary identification card, transaction card, or other primary account wishes to provide data relating to this primary account to administrators/processors of other accounts. Card account holders, for example, often have a number of separate accounts administered by various entities. When a card account holder wishes to provide provisioning information for the holder's card account (or other primary user account) to these entities, the card account holder generally is required to log into the account processing system for each entity and manually enter the card account provisioning information. Some card account administrators may facilitate this to a certain extent by giving their card holders the option of stepping through a list of account processing entities and identifying those that the card holder wishes to have provisioned with card account information. This approach still has the drawback that, for each entity, the card account holder must be taken through the entity's login process. The resulting process is not only time-consuming, it requires the account holder to provide login credentials for every entity.

SUMMARY OF THE INVENTION

An illustrative aspect of the invention provides a method for broadcasting provisioning information to multiple account processing systems. The method comprises transmitting, by an administrator data processor to a plurality of account processing systems, user datum encryption information. The method further comprises receiving, by the administrator data processor from a user device associated with an account holder having a user account administrated by the administrator data processor, a request to share account provisioning information associated with the account holder. The method still further comprises encrypting, by the administrator data processor, a user datum associated with the account holder using the user datum encryption information. The method also comprises transmitting, by the administrator data processor to each of the plurality of account processing systems, a user account query including the encrypted user datum and receiving, by the administrator data processor from at least one of the plurality of account processing systems, a response comprising a notification that the account holder has a transaction account processed by that account processing system. The method further comprises transmitting, by the administrator data processor to the user device, a message comprising a request for confirmation that the account provisioning information should be shared with the at least one of the plurality of account processing systems. The method also comprises receiving, by the administrator data processor from the user device, a confirmation response including permission to share account provisioning information and transmitting, by the administrator data processor to one or more of the at least one of the plurality of account processing systems, the account provisioning information.

Another aspect of the invention provides an automated system for broadcasting provisioning information to multiple account processing systems. The system comprises a datum encryption data processor, a user account identification data processor, a user confirmation data processor, and a provisioning information broadcast data processor. The datum encryption data processor is configured to generate user datum encryption information, and to transmit the user datum encryption information to a plurality of account processing systems. The user account identification data processor is configured to receive, over a first network from a user device associated with an account holder having a user account, a request to share account provisioning information associated with the account holder. The user account identification data processor is further configured to encrypt a user datum associated with the account holder using the user datum encryption information, transmit, over a second network to each of the plurality of account processing systems, a user account query including the encrypted user datum, and receive, over the second network from at least one of the plurality of account processing systems, a response comprising a notification that the account holder has a transaction account processed by that account processing system. The user confirmation data processor is configured to transmit, to the user device over the first network, a message comprising a request for confirmation that the account provisioning information should be shared with the at least one of the plurality of account processing systems. The user confirmation data processor is also configured to receive, from the user device over the first network, a confirmation response including permission to share account provisioning information. The provisioning information broadcast data processor is configured to transmit, over the second network, the account provisioning information to one or more of the at least one of the plurality of account processing systems.

Another aspect of the invention provides a non-transitory, computer readable medium comprising instructions that, when executed on a data processing system, perform actions comprising transmitting, to a plurality of account processing systems, user datum encryption information, receiving, from a user device associated with an account holder having a user account administrated by the administrator data processor, a request to share account provisioning information associated with the account holder, encrypting a user datum associated with the account holder using the user datum encryption information, transmitting, to each of the plurality of account processing systems, a user account query including the encrypted user datum, receiving, from at least one of the plurality of account processing systems, a response comprising a notification that the account holder has a transaction account processed by that account processing system, transmitting, to the user device, a message comprising a request for confirmation that the account provisioning information should be shared with the at least one of the plurality of account processing systems, receiving, from the user device, a confirmation response including permission to share account provisioning information, and transmitting the account provisioning information to one or more of the at least one of the plurality of account processing systems.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides automated methods by which an account administrator (e.g., a bank or transaction card account administrator) can securely push account provisioning information and user data to multiple account processing entities without the need for the account holder to switch applications, authenticate or log into the processing system for each entity. This is accomplished through the use of a shared encryption/hashing algorithm that allows the primary account administrator and partner account processing entities to identify account holders they have in common and establish the basis for secure transmission of primary account provisioning information for a particular primary account holder from the primary account administrator to those partner entities also having an account for that primary account holder.

The present invention is usable for any type of account, but is of particular value for those associated with a smart card (e.g., a chip-provided identification card or transaction card). While not limited to such accounts, the invention may be of particular value in relation to card-based financial accounts. As used herein, the term financial account encompasses any account through which financial transactions may be processed. Financial accounts can include, for example, credit accounts, savings accounts, checking accounts, investment accounts, and the like.

Figure 1:
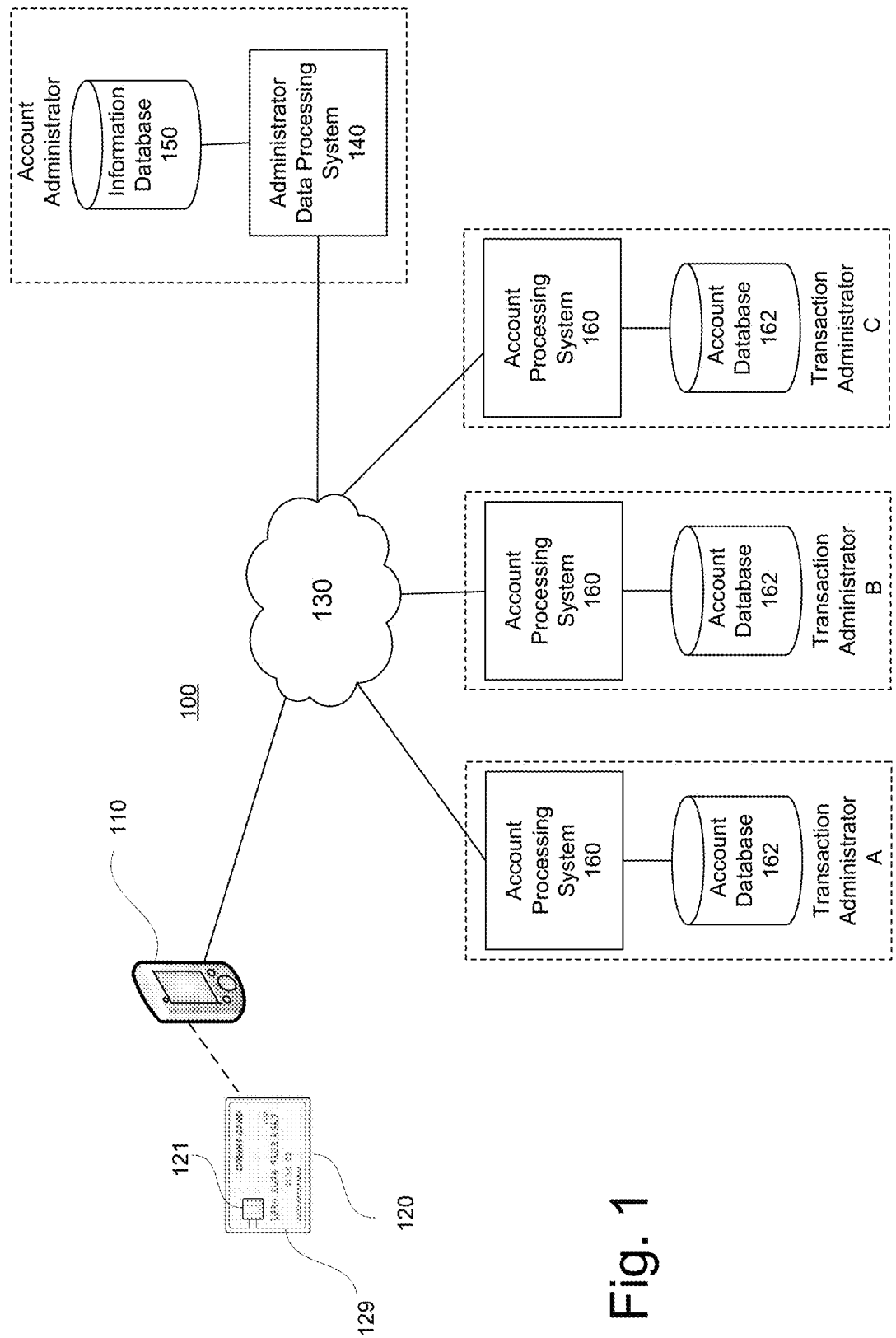
FIG. 1 is a schematic representation of a system for broadcasting provisioning information to multiple account processing systems according to an embodiment of the invention.

Embodiments of the invention may be best understood with reference to FIG. 1, which illustrates an exemplary account transaction system 100 that encompasses a user device 110, an account administrator for a primary account of an account holder associated with the user device 110, and a plurality of transaction administrator entities A, B, C, each having an account processing system 160 and an account information database 162. The account administrator has an administrator data processing system 140 and an account information database 140. In the illustrated example, the user device 110, the account processing systems 160, and the administrator data processing system 140 are network-enable computer systems configured to communicate with each other via a communication network 130.

As referred to herein, a network-enabled computer system and/or device may include, but is not limited to any computer device, or communications device (or combination of such devices) including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

The network-enabled computer systems used to carry out the transactions contemplated in the embodiments may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 1 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

The network 130 may be any form of communication network capable of enabling communication between the transaction entities and the card processing system 100. For example, the network 130 may be one or more of a wireless network, a wired network or any combination of wireless network and wired network. The network 130 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 130 may utilize one or more protocols of one or more network elements to which it is communicatively coupled. The network 130 may translate to or from other protocols to one or more protocols of network devices. Although the network 130 is depicted as a single network, it will be appreciated that it may comprise a plurality of interconnected networks, such as, for example, the Internet, a service provider's network, a cable television network, corporate networks, and home networks.

In the example embodiments presented herein, an account holder may be any individual or entity having a primary account with an account administrator (e.g., a bank or primary card account processor) and, typically, one or more secondary accounts with account processing entities (e.g., merchants or other service providers). An account holder user device 110 may be a mobile device or other processor that an account holder uses to carry out a transaction. An account may be held by any place, location, object, entity, or other mechanism for performing transactions in any form, including, without limitation, electronic form. An account may be a financial account or a non-financial transaction account. In various embodiments, a card-facilitated account may be a credit card account, a prepaid card account, stored value card account, debit card account, check card account, payroll card account, gift card account, prepaid credit card account, charge card account, checking account, rewards account, line of credit account, credit account, mobile device account, or mobile commerce account. In some instances, the account holder may be a transaction processing entity such as a financial institution, credit card provider, or other entity that offers accounts to customers.

Figure 2:
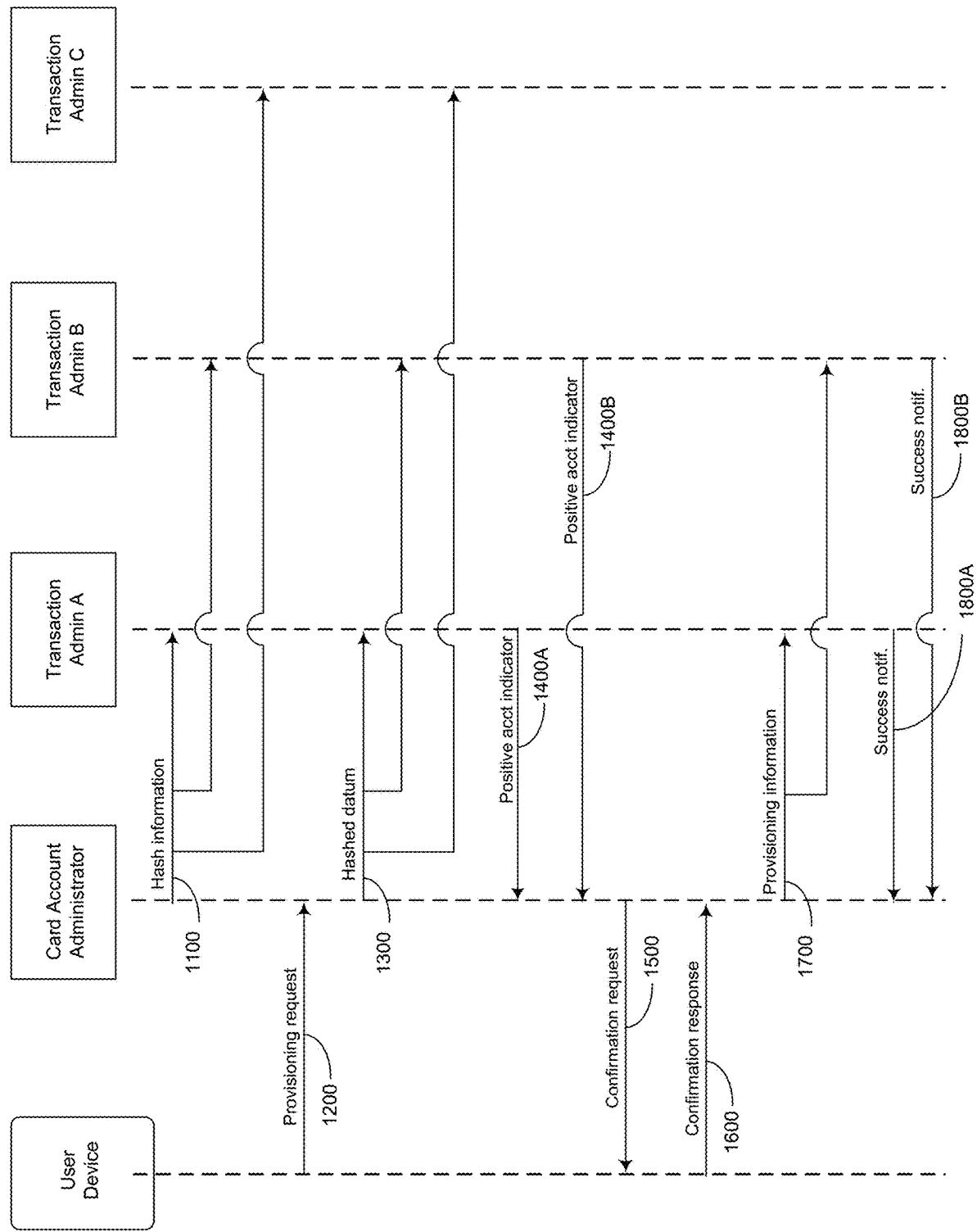
FIG. 2 illustrates a sequence of operations for automatically broadcasting account provisioning information to multiple transaction administrator systems according to an embodiment of the invention.

The sequence diagram of FIG. 2 illustrates an exemplary application of embodiments of the invention in conjunction with the system 100 of FIG. 1. In the scenario set forth in FIG. 2, an account holder associated with a user device (e.g., user device 110) has a card account with a card account administrator and also has accounts with multiple transaction account administrators. In this scenario, the account holder wishes to provision the account processing systems of the transaction administrative entities with information associated with the cardholder account. Embodiments of the present invention provide an automated process by which the card account administrator can accomplish such provisioning with partner transaction administrators who also have accounts with that account holder. As part of this process and as shown in FIG. 2, the card account administrator, at 1100, securely transmits to its partner transaction administrators unique information that can be used to encrypt a predetermined piece of account holder information that is unique to the account holder and would typically be available to all of the administrators. This piece of account holder information (sometimes referred to herein as an account holder datum or user datum) may be. for example, a telephone number, email address, driver's license number, social security number, or employee number. The encryption information may be, for example, a unique algorithm and/or encryption key values usable to create a hash of a standardized format version of the account holder datum. The encryption information may be configured so that the hashing result cannot be reversed to determine the account holder datum. At the time the card account administrator transmits the hash information to the transaction administrators, it may also specify the particular account holder datum to be used and the format it should be in prior to hashing. Once the hash information is received, each transaction administrator can then use it to generate a hashed datum for each of its own account holders, which it then stores in it account holder information database.

In the scenario of FIG. 2, the card account holder can then send a provisioning request to the card account administrator at 1200. This may typically be accomplished using a card account application on the account holder's user device. The request is received by the card account administrator's data processing system. In response, the card account administrator uses the hash information to encrypt the proper account holder datum and, at 1300, transmits it to all of the partner transaction administrators. Each of the transaction administrators may then compare the hashed datum to each hashed account holder datum in its account database to determine if the card account holder has an account with that administrator. In the scenario illustrated in FIG. 2, Transaction Administrators A and B each find that they have a matching hashed datum and, thus, have an account for the card account holder. Accordingly, at 1400A and 1400B, Transaction Administrators A and B transmit a response to the card account administrator that includes a positive account indicator. Transaction Administrator C fails to find a matching hashed datum, and thus, does not transmit a response. It will be understood that, in some embodiments, Transaction Administrator C could still send a response, but with a negative account indicator.

The hashed user datum approach described above allows the card account administrator and the transaction administrators to determine if they have a particular account holder in common without having to share any account holder information. Thus, no usable account holder information is shared with transaction administrators who do not have an account with the account holder.

Having received positive account indicators from at least some of its partners, the card account administrator, at 1500 of the exemplary sequence of FIG. 2, transmits a confirmation request to the account holder's user device. The confirmation request may include a request that the account holder verify that he/she wishes to send provisioning information to some or all of the responding transaction administrators. In addition or instead, the confirmation request may require that the account holder provide authorization confirmation information. This may be or include any suitable information usable by the card account administrator to confirm that the user of the user device is the account holder and/or is authorized to make the provisioning request. At 1600, the user device transmits a confirmation response to the card account administrator, which uses the information in the response to establish which, if any, of the transaction administrators is to receive provisioning information and/or verify authorization of the user device and user to request provisioning of the transaction administrators. In the exemplary scenario, the card account administrator determines that Transaction Administrators A and B should receive provisioning information. At 1700, the card account administrator assembles the provisioning information and transmits it to Transaction Administrators A and B. The actual provisioning information may be any information associated with the card holder account that would be usable by the transaction administrators to draw an association between their own accounts for the card account holder and the card holder account. In many cases, the provisioning information may include a card identifier that can be used to facilitate a transaction and associate it with the card holder account. At 1800A and 1800B, respectively, the Transaction Administrators A and B transmit a notification to the Account Administrator indicating that the account provisioning was successfully completed. This may be accomplished, for example, through an API call back.

It will be understood that while FIGS. 1 and 2 illustrate three transaction administrators, the invention is not limited to any particular number of transaction administrators. The methods and systems of the invention may be used with as many transaction administrator entities as are willing to partner with the account administrator. Indeed, the value of the invention increases with the number of partner administrators involved.

Figure 3:
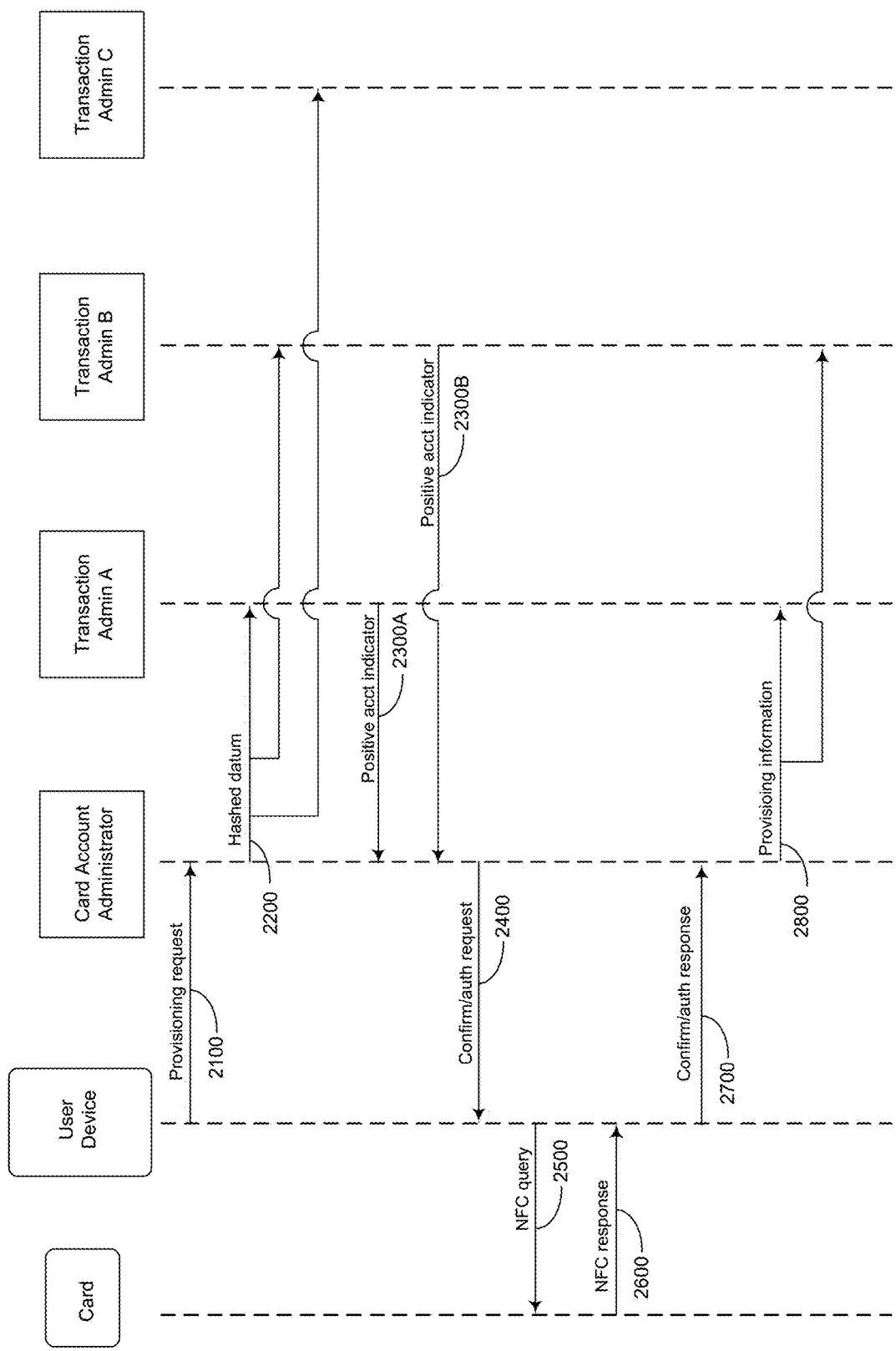
FIG. 3 illustrates a sequence of operations for automatically broadcasting account provisioning information to multiple transaction administrator systems according to an embodiment of the invention.

An exemplary variation on the scenario of FIG. 2 is shown in the sequence diagram of FIG. 3. In this variation, the method requires the presence of the card associated with the account in order for the account holder's request to be carried out. In the illustrated sequence, it is assumed that the card account administrator has already shared user datum hashing information with its partner transaction administrators. As in the previous example, the card account holder uses the user device to send a provisioning request to the card account administrator at 2100. At 2200, the card account administrator transmits a hashed account holder datum to Transaction Administrators A, B, and C. Again, Transaction Administrators A and B determine that the card account holder is one of their account holders and, thus, send positive account holder indicators to the card account administrator at 2300A and 2300B, respectively. The card account administrator then transmits a confirmation/authorization request to the user device at 2400.

The confirmation/authorization request may, as in the previous example, ask the account holder to verify that he/she wishes to send provisioning information to some or all of the responding transaction administrators. It may also require information usable by the card account administrator to verify authorization of the provisioning requestor. In the illustrated scenario, this requires that communication be established between the user device and the transaction card. In typical embodiments, this communication is established through near field communication (NFC). Thus, at 2500, the user device transmits an NFC prompt to the transaction card. In response, the transaction card transmits, at 2600, information usable by the card account administrator to verify its presence. This may be or include, for example, security information encrypted by the card using a private key unique to the card that is known only to the card account administrator. At 2700, the user device transmits a confirmation response that may include a confirmation of the transaction administrators by the account holder and the encrypted security information. Other verification information supplied by the account holder may also be included. Upon receiving the confirmation response, the card account administrator verifies authorization using the security information from the confirmation response. Upon successful verification, the card account administrator transmits account provisioning information to Transaction Administrators A and B at 2800.

Details of system components usable in embodiments of the invention and, in particular, the system 100 will now be described.

Figure 4:
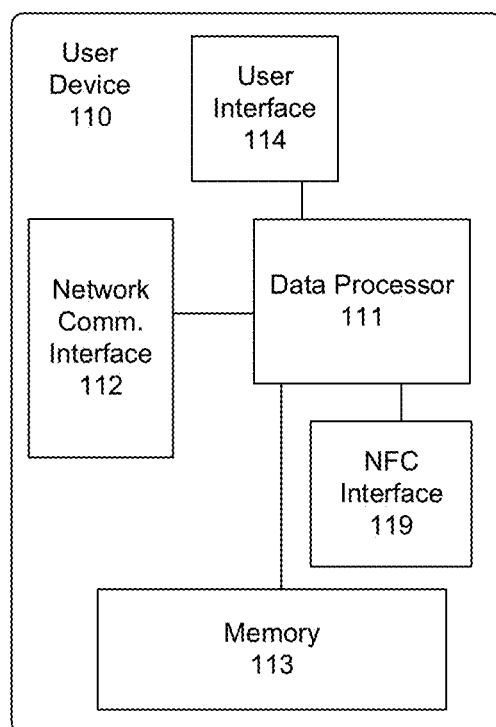
FIG. 4 is a schematic representation of a user processing device usable in embodiments of the invention.

With reference to FIG. 4, the account holder user device 110 may be any computer device or communications device including a server, a network appliance, a personal computer (PC), a workstation, and a mobile interface device such as a smart phone, smart pad, handheld PC, or personal digital assistant (PDA). In a particular embodiment illustrated in FIG. 3, the user device 110 includes an on-board data processor 111 in communication with a memory module 113, a user interface 114, and a network communication interface 112. The data processor 111 may include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 114 of the device 110 includes a user input mechanism, which can be any device for entering information and instructions into the user device 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays.

The network communication interface 112 is configured to establish and support wired and/or wireless data communication capability for connecting the device 110 to the network 130 or other communication network. The network communication interface 112 can also be configured to support communication with a short-range wireless communication interface, such as Bluetooth.

In some embodiments, the user device 110 may include an NFC interface 119 configured for establishing NFC communication with other NFC-equipped devices. In some of these embodiments, the NFC interface 119 may be or include an NFC receiver configured for selectively activating a magnetic field for use in establishing near field communication with an NFC transmitter. The NFC interface 119 is configured for establishing NFC communication when a passive NFC tag or other NFC-enabled device is brought into the magnetic field and within NFC communication range of the user device 110. The NFC interface 119 is configured, in particular, for communication with an NFC-enabled smart transaction card 120 when the card 120 is brought within communication range of the user device 110.

In embodiments of the invention, the memory 113 may have stored therein one or more applications usable by the data processor 111 to conduct and/or monitor transactions between the user device 110 and transaction processing devices or systems over the network 130. These applications may include instructions usable by the data processor 111 to identify transaction events, store event data in the memory 113, and communicate event data to a transaction information processing system, the administrator data processing system 140, and/or one or more of the account processing systems 160.

In particular embodiments, the memory 113 may include a card account application configured for carrying out transactions on a card account associated with an account holder user of the user device 110. The application may, in particular, be configured for carrying out interactive communications/transactions with the administrator data processing system 140 and, in some embodiments, one or more transaction account processing systems 160. The application instructions may be configured for receiving, from the account holder via the user interface 114, login information for establishing authenticatable communication with the administrator data processing system 140. The login information may include an account identifier or other user identification and user authentication information.

Among other functions, the card account application may include instructions for implementing a provisioning function, the result of which is the pushing of card account provisioning information to account processing systems 160 of account processing entities with whom the card account holder has a separately managed account. These instructions may include instructions for the data processor 111 to receive from a user via the user interface a direction to transmit, via the network communication interface 112 and the network 130, a provisioning request to the administrator data processing system 140. The provisioning request may include information identifying the user device, the account holder, an account identifier, and/or a card identifier for a transaction card associated with the account. In some embodiments, the request may identify one or more specific transaction processing entities that the user wishes to include in the provisioning action. The application may include further instructions to receive a confirmation request from the administrator data processing system 140 over the network 130. The confirmation request may include a request that the user confirm that the user wishes to push card account information to the administrator's partner entities. In such embodiments, the application is configured to display the request on the user interface and receive a response from the user. In some embodiments, the request may identify the partner entities that have indicated they have an account for the user. In such embodiments, the request may give the user the opportunity to select a subset of the identified partner entities that the user wishes to receive card account information.

In some embodiments, the confirmation request may also include a request for authentication information that can be used by the administrator data processing system 140 to verify authorization of the user and/or the user device to make and confirm the provisioning request. Authentication information may include an account identifier or other user identification and user authentication information. The user authentication information may include at least one authentication credential such as a password or a scanned biometric characteristic. In some embodiments, an authentication credential may be or include information encrypted using an encryption key associated with the card account and the account holder or the user device 110.

In particular embodiments, the confirmation request may require authentication information that is or includes card verification information that must be obtained from a smart card 120 associated with the cardholder account. In such embodiments, the user device application may be configured to display an instruction for the user to place the card 120 within NFC communication range of the user device 110. The application may be further configured to cause the data processor 111 to transmit, via the NFC interface 119, an authorization query to the card 120 and to receive a query response from the card 120. In some embodiments, the card may be configured to automatically transmit verification information upon being brought within NFC communication range. In such embodiments, an explicit query by the user device 110 to the card 120 may be unnecessary.

The user device application may be further configured to instruct the data processor 111 to construct a confirmation response including confirmation and/or authentication/verification information and to transmit the response to the administrator data processing system 140 via the network communication interface 112 and the network 130. The application may also be configured to receive and display a provisioning completion message from the administrator data processor 140.

The transaction card 120 may be any chip-carrying transaction card ("smart" card) having electrical and/or near field or other short range communication capabilities. A typical transaction card 120 that is usable in various embodiments of the invention is a smart card with a microprocessor chip 121. The microprocessor chip 121 includes processing circuitry for storing and processing information, including a microprocessor and a memory. It will be understood that the processing circuitry may contain additional components, including processors, memories, error and parity/CRC checkers, data encoders, anticollision algorithms, controllers, command decoders, security primitives and tamper-proofing hardware, as necessary to perform the functions described herein.

The transaction card 120 may be configured for communication with transaction terminals and other devices via a communication interface configured for establishing communication with transaction processing devices. The communication interface may be configured for contact-based communication, in which case the interface may have electrical circuitry and contact pads on the surface of the card 120 for establishing direct electrical communication between the microprocessor and the processing circuitry of a transaction terminal. Alternatively or in addition, the communication interface may be configured for contactless communication with a transaction terminal or other wireless device. In such embodiments, the communication interface may be or include an NFC communication interface configured for communication with other NFC communication devices when the card 120 is within a predetermined NFC range. The communication interface and the microprocessor may, in particular, be configured for establishing NFC communication with the user device 110. In some embodiments, the microprocessor chip 121 may include a second communication interface configured for establishing short range communication with the user device 110 via Bluetooth, or other short range communication methodology. In such embodiments, the transaction card 120 may have a short range communication antenna 129 that is included in or connected to the short range communication interface. The microprocessor chip 121 may also include a power management system for use in managing the distribution of power during an NFC transaction.

The memory may be a read-only memory, write-once read-multiple memory or read/write memory, e.g., RAM, ROM, and EEPROM, and the chip 121 may include one or more of these memories. The memory may have stored therein information associated with a transaction card account. In some embodiments, the memory may have permanently stored therein a unique alphanumeric identifier associated with the account. It may also have stored public and private card encryption keys. In some embodiments, the private and public encryption keys may be permanently hard-wired into the card memory.

The card memory may be configured to store one or more software applications for execution by the microprocessor. In various embodiments, the memory may have stored therein instructions for generating encrypted information and transmitting it to a receiving device (e.g., the user device 110). Such encrypted information may be or include an encrypted verification block or signature that may be used to authenticate and verify the presence of the transaction card 120 during transaction processing. In some embodiments, encrypted information be unique to a particular communication (e.g., a particular NFC transmission by the transaction card).

The transaction administrator account processing systems 160 are network-enabled data processing systems that are each configured for management and control of account-related transactions for a plurality of user accounts. Each account processing system 160 may be configured for communication with a plurality of user devices 110 via the network 130 for establishing interactive communication sessions with account holders. The account processing systems 160 may also be configured for communication with other entities via the network including the account administrator data processing system 140. The processing systems 160 may be configured, in particular, to receive hashing information from the administrator data processing system 140 and to use this information to encrypt a standard, formatted account holder datum for each account holder of their respective administrator entities. The hashed datum for each account holder may then be stored with other account holder information in an account database storage unit 162. Each account processing system 160 may also be configured to receive a subsequent user account query from the administrator data processing system 140 via the network 130. The user account query may include an encrypted cardholder account datum, which the account processing system 160 can compare to the stored datum for each of its account holders. Upon finding a hashed account holder datum that matches the hashed card holder datum, the account processing system 160 may transmit to the administrator data processing system 140 a positive query response indicating that the associated transaction administrator has an account for the card holder.

The account information in the account database 162 may include information on the account holder as well as information on accounts with other administrators. Account holder information may include contact information (mailing address, email address, phone numbers, etc.) and user preferences. It may also include information for a primary account (e.g., a bank or other cardholder administrator) for use in certain transactions related to the account with that administrator entity. The account processing systems 160 may be configured to receive primary account provisioning information for an account holder from the administrator data processing system 140 and store it in the account information databases 162.

In particular embodiments, some or all of the transaction administrators may be merchants whose account processing systems 160 are configured to carry out merchant transactions. In some of these embodiments, the user account administered by the account administrator is a contactless transaction card account, and the account provisioning information includes contactless card account information for use in carrying out merchant account holder transactions processed by the account processing systems 160.

Figure 5:
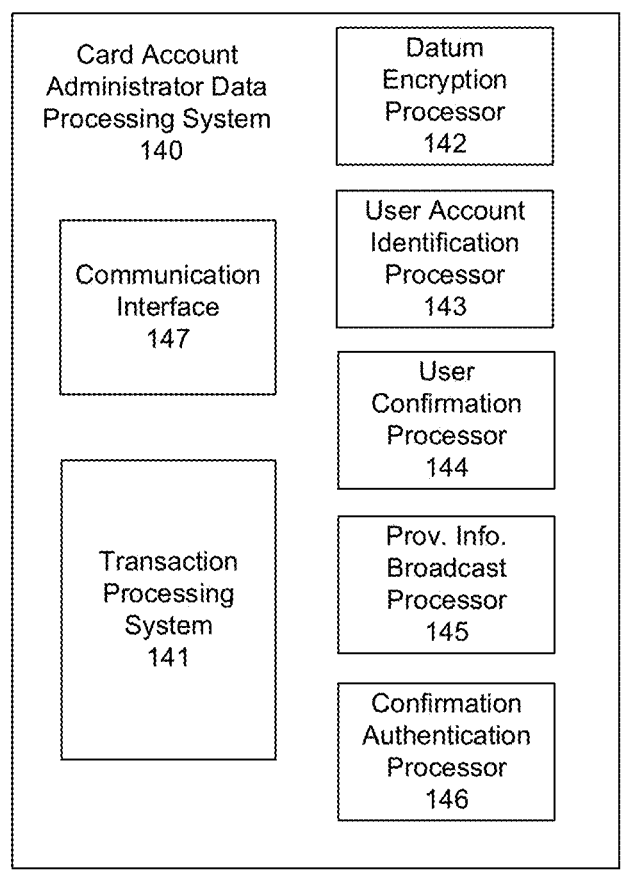
FIG. 5 is a schematic representation of a card account administrator data processing system according to an embodiment of the invention.

With reference to FIG. 5, the administrator data processing system 140 may include a communication interface 147 configured for establishing communication with one or more networks including the network 130, and, via the one or more networks, the user device 110 and one or more transaction administrator account processing systems 160. The administrator data processing system 140 includes a transaction processing system 141 configured to communicate with a plurality of user devise 110 and with other transaction processing systems via the network 130 and the network interface 147. The transaction processing system 141 may be configured for receiving and processing card account and transaction information. In particular embodiments, this may include, for example, processing financial transactions related to financial transaction card accounts.

The administrator data processing system 140 may further include a datum encryption processor 142, a user account identification processor 143, a user confirmation processor 144, and a provisioning information broadcast processor 145. In some embodiments, the system 140 may also include a confirmation authentication processor 146. Any or all of these processors may be configured to communicate over the network 130 via the communication interface 147.

The datum encryption data processor 142 may be configured to generate user datum encryption information adapted for encrypting a particular card account holder datum. The card account holder datum may be a typical piece of account holder information that is unique to the card account holder and would typically be known or available to any account administrator with whom the card account holder may have an account. The card account holder datum could be. for example, a telephone number, email address, driver's license number, or employee number. The encryption information may be, for example, a unique algorithm and/or values usable to create a hash of a standardized format version of the card account holder datum. The datum encryption processor 142 may also be configured to transmit, via the network 130, the user datum encryption information to any or all of a plurality of account processing systems 160 managed by transaction administrator entities that have agreed to partner with the card account administrator. At the time the datum encryption processor 142 transmits the encryption information to the account data processing systems 160, it may also specify the particular account holder datum to be used and the format it should be in prior to encrypting.

The user account identification data processor 143 may be configured to receive, over a first network (e.g., network 130) from a user device 110 associated with a card account holder having an account with the card account administrator account, a request to share account provisioning information. The provisioning request may include information identifying the user device, the account holder, an account identifier, and/or a card identifier for a transaction card associated with the account. In some embodiments, the request may identify one or more specific transaction processing entities that the user wishes to include in the provisioning action. The provisioning information may be or include any information associated with the card holder account that would be usable by the transaction administrators to draw an association between their own accounts for the card account holder and the card holder account. In particular embodiments, the provisioning information may include a card identifier or card account identifier that can be used to facilitate a transaction and associate it with the card holder account. In some embodiments, the request may include limitations on the provisioning information to be shared. The user account identification data processor 143 may be further configured to encrypt a user datum associated with the account holder using the user datum encryption information. The user datum would be drawn from the account holder information stored in the card holder account information database 150. It would be selected and formatted so as to match the datum specifications provided to the transaction administrator data processing systems 160.

The user account identification data processor 143 may be further configured to transmit, over a second network (which may be the same as the first network) to each of the partner account processing systems 160, a user account query including the encrypted user datum. The processor 143 may also be configured to receive, over the second network, responses from any or all of the partner processing systems 160. In some embodiments, each response may include an indication that the account administrator associated with the responding processing system 160 has or does not have its own account for the card account holder. In other embodiments, responses are only received from account processing systems 160 associated with transaction administrators that have accounts with the card account holder. The user identification processor 143 may be configured to determine from the query responses a subset of the partner account processing systems 160 that have accounts for the card holder.

The user confirmation data processor 144 may be configured to transmit to the user device 110 over the first network, a message including a request for confirmation that the account provisioning information should be shared. The message may include identification of the members of the subset of account processing systems 160 (and/or their associated administrator entities) identified by the user account identification processor 143. The user confirmation data processor 144 may be further configured to receive from the user device, a confirmation response. This response may include permission to share account provisioning information. In some embodiments, the response may indicate that provisioning information should be shared with only certain of the subset of account processing systems 160.

The provisioning information broadcast data processor 145 may be configured to retrieve card account information for the card holder account from the account information database 150 and assemble it for transmission to the approved account processing systems 160. Typical account holder information could include name, email address, physical address, phone number, employer, social security number or other unique identifier, etc. In some embodiments, the provisioning information may be assembled into a single standard format for all of the different account administrators. In other embodiments, the format may be tailored to each administrator to meet requirements of that administrator's account processing system 160 and/or account database 162. The provisioning information broadcast data processor 145 may also be configured to transmit, over the second network, the account provisioning information to each approved account processing system 160.

As noted above, the administrator data processing system 140 may also include a confirmation authentication processor 146. The confirmation authentication processor 146 may be a separate processor as illustrated in FIG. 5. Alternatively, the functions of the confirmation authentication processor 146 may be combined with those of the user confirmation processor 144. The confirmation authentication data processor 146 may be configured to transmit a confirmation authentication request to the user device 110 over the first network. In some embodiments, this request may be combined with the confirmation request. In other embodiments, the confirmation authentication request may be transmitted in response to the user confirmation data processor 144 receiving a confirmation response including permission to share account provisioning information.

The confirmation authentication request may include a request for authentication information that can be used by the confirmation authentication processor 146 to verify authorization of the user and/or the user device 110 to make and confirm the provisioning request. Authentication information may include an account identifier or other user identification and user authentication information. Authentication information may include an account identifier or other user identification and user authentication information. The user authentication information may include at least one authentication credential such as a password or a scanned biometric characteristic that may be used as part of a multi-factor authentication methodology. In some embodiments, an authentication credential may be or include information encrypted using an encryption key associated with the card account and the account holder or the user device 110. In particular embodiments, the confirmation request may require an authentication credential that is or includes card verification information that must be obtained from a smart card 120 associated with the cardholder account.

The confirmation authentication processor 146 may be configured to receive authentication information from the user device 110 over the first network. The confirmation authentication processor 146 may then use authentication credentials from the authentication information and information from the card account information database 150 to authenticate the confirmation response. This may be accomplished using any of various known authentication processes associated with particular credentials. In embodiments where encrypted card verification information is received, the authentication processor 146 may be configured to retrieve encryption information from the card account information database 150 and use it to decrypt the card-encrypted information. Successful decryption may be used as a positive indication that the provisioning requester is in possession of the transaction card 120 for the card account.

It will be understood that, in embodiments having a confirmation authentication processor 146, the provisioning information broadcast data processor 145 may be configured to transmit account provisioning information only after the confirmation authentication processor has established a positive authentication for the user, user device, and/or confirmation response.

Figure 6:
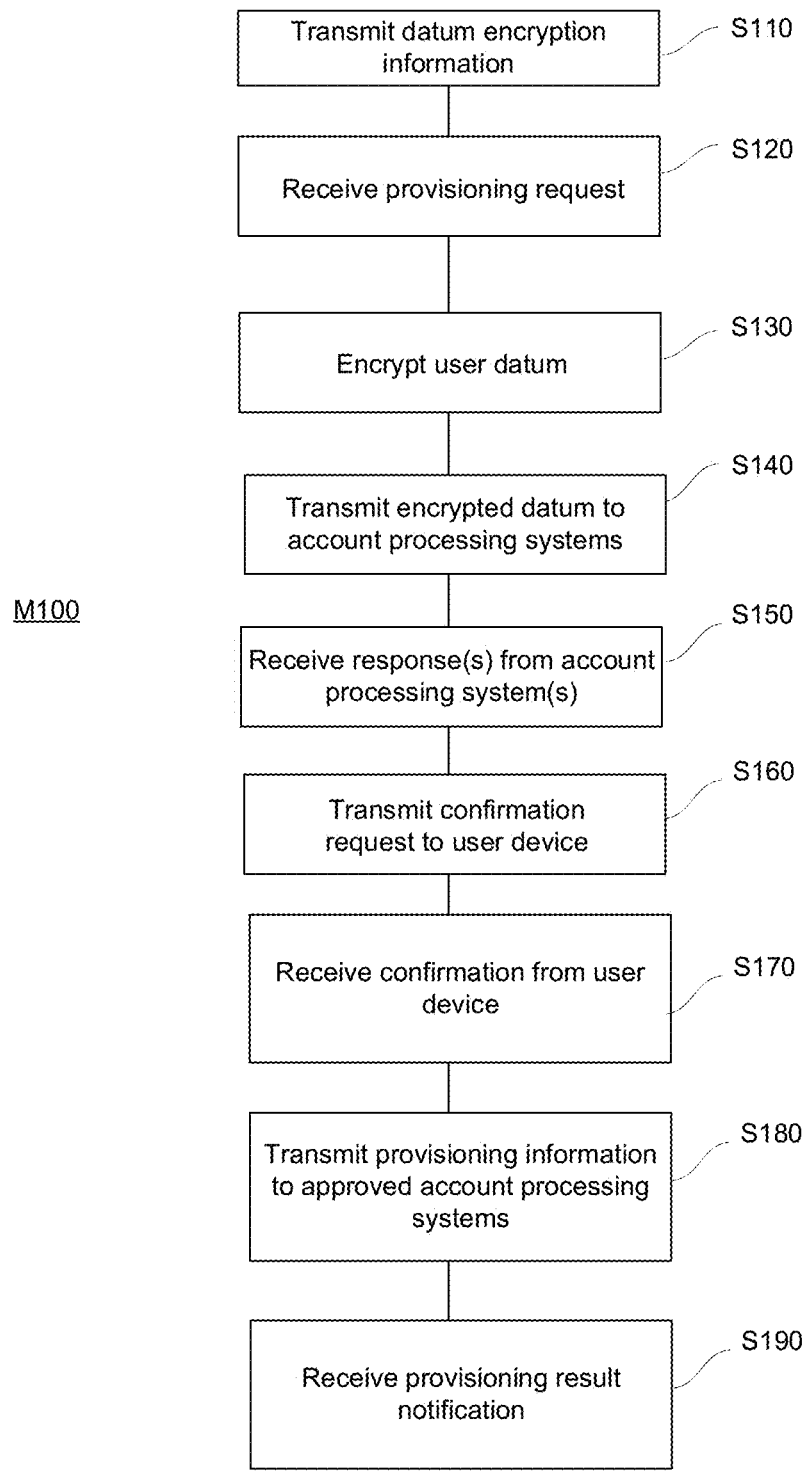
FIG. 6 is a flow diagram illustrating a method of broadcasting provisioning information to multiple account processing systems according to an embodiment of the invention.

FIG. 6 illustrates an exemplary method M100 for broadcasting provisioning information to multiple account processing systems. The actions of the method M100 may typically be carried out by an account administrator data processing system such as the administrator data processing system 140 of the system 100 depicted in FIG. 1. As previously described, the administrator data processing system may be configured for managing a plurality of accounts, which may be transaction card or other primary accounts. Each of these accounts may have one or more unique identifiers, an associated account holder, and stored account holder information. Prior to or as part of the method M100, the account administrator data processing system may generate user datum encryption information adapted for encrypting a particular account holder datum as described above. At S110 of the method M100 the administrator data processor may transmit the user datum encryption information to a plurality of account processing systems associated with partner transaction administrators. At S120, the administrator data processor receives a request to share account provisioning information. This request may be received from a user device associated with an account holder having a user account administrated by the administrator data processor. At S130, the administrator data processor encrypts a user datum associated with the account holder. The encryption is accomplished using the user datum encryption information previously shared with the partner account processing systems. At S140, the administrator data processor transmits to each of the account processing systems a user account query that includes the encrypted user datum. At S150, the administrator data processor receives a response from one or more of the partner account processing systems. This response may be a positive response comprising a notification that the account holder has a transaction account processed by that account processing system. In some embodiments, the administrator data processor may also receive a negative response from one or more account processing systems indicating that the account holder does not have a transaction account processed by that account processing system. From the query responses, the administrator data processor may assemble a set of account processing systems that process a transaction account for the account administrator's account holder. At S160, the account administrator data processor transmits to the account holder's user device a message comprising a request for confirmation that the account provisioning information should be shared with the set of account processing systems. In some embodiments, the message may include a list of the account processing systems and/or their associated administrators. At S170, the administrator data processor receives from the user device a confirmation response including permission to share account provisioning information. In some embodiments, this response may include a selection of particular account processing systems and/or limitations on the provisioning information to be shared. At S180, the administrator data processor transmits the account provisioning information to one or more of the account processing systems. In typical embodiments, the information will be transmitted to all of the set of account processing systems for partner administrators having an account for the account holder. In some embodiments, the information will be transmitted only to those account processing systems explicitly approved or identified by the account holder. At S190, the administrator data processor may receive a notification from each of the one or more account processing systems indicating that the account provisioning for that account processing system was successfully completed. This may be accomplished, for example, through an API call back. In some embodiments, the notification may alternatively include a negative result indicating that provisioning failed. Such a notification may include information on known or suspected reasons for the failure.

Figure 7:
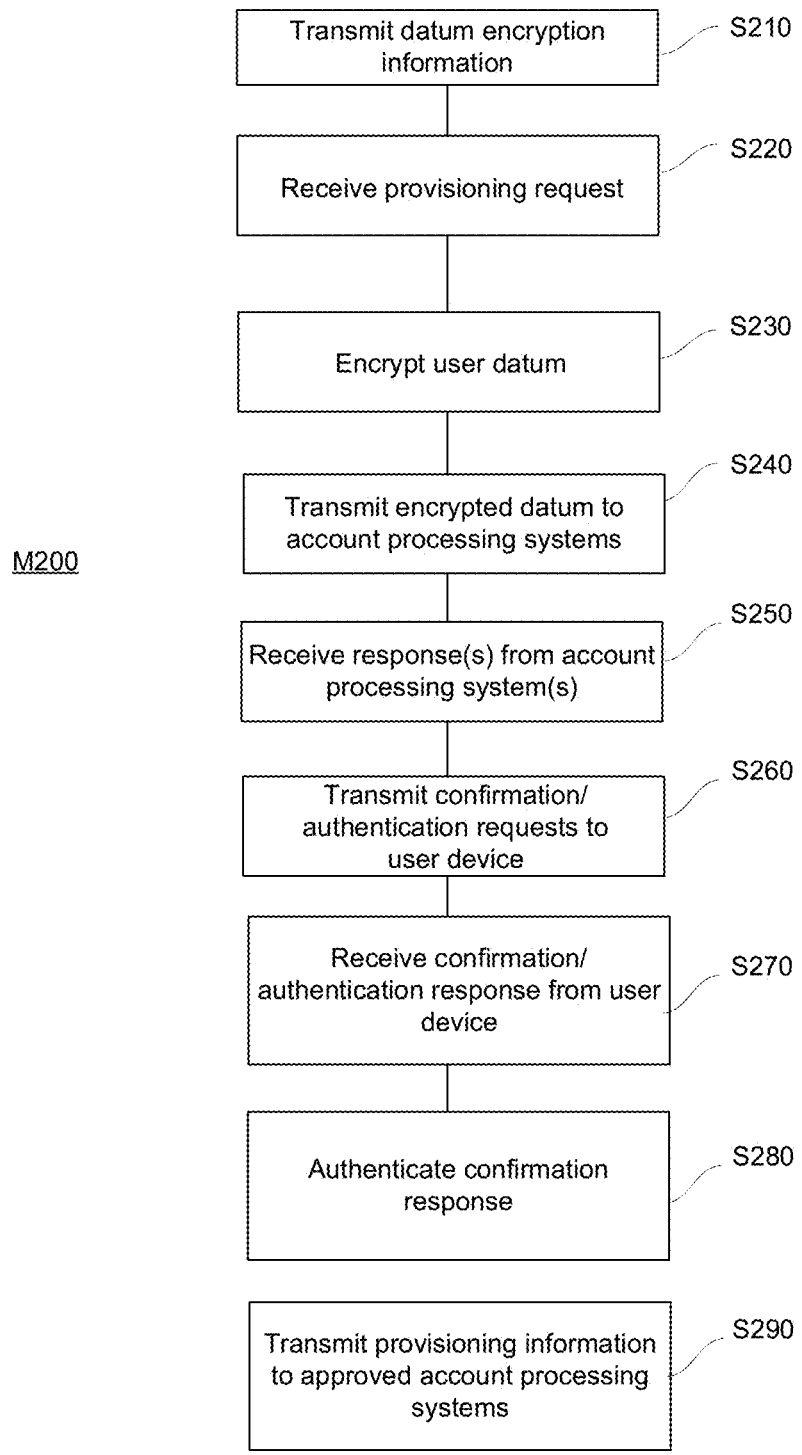
FIG. 7 is a flow diagram illustrating a method of broadcasting provisioning information to multiple account processing systems according to an embodiment of the invention.

FIG. 7 illustrates another exemplary method M200 for broadcasting provisioning information to multiple account processing systems. As in the previous example, the actions of the method M200 may be carried out by an account administrator data processing system such as the administrator data processing system 140 of the system 100 depicted in FIG. 1. As in the previous method, the account administrator data processing system may generate user datum encryption information adapted for encrypting a particular account holder datum as described above. At S210 of the method M100 the administrator data processor may transmit the user datum encryption information to a plurality of account processing systems associated with partner transaction administrators. At S220, the administrator data processor receives a request to share account provisioning information. This request may be received from a user device associated with an account holder having a user account administrated by the administrator data processor. At S230, the administrator data processor encrypts a user datum associated with the account holder. The encryption is accomplished using the user datum encryption information previously shared with the partner account processing systems. At S240, the administrator data processor transmits to each of the account processing systems a user account query that includes the encrypted user datum. At S250, the administrator data processor receives a response from one or more of the partner account processing systems. This response may be a positive response comprising a notification that the account holder has a transaction account processed by that account processing system. In some embodiments, the administrator data processor may also receive a negative response from one or more account processing systems indicating that the account holder does not have a transaction account processed by that account processing system. From the query responses, the administrator data processor may assemble a set of account processing systems that process a transaction account for the account administrator's account holder. At S260, the account administrator data processor transmits to the account holder's user device a message comprising a request for confirmation that the account provisioning information should be shared with the set of account processing systems. In some embodiments, the message may include a list of the account processing systems and/or their associated administrators. The message also includes a request for authentication information usable by the administrator data processor to authenticate the confirmation response by providing authentication information for the user and/or the user device. The requested authentication information may, in addition or instead, require information generated by a transaction card associated with the account. At S270, the administrator data processor receives from the user device a confirmation response including permission to share account provisioning information. In some embodiments, this response may include a selection of particular account processing systems and/or limitations on the provisioning information to be shared. the response also includes authentication information. At S280, the administrator data processor uses the authentication information to authenticate the confirmation response. This may include verifying that the user device is associated with the account, verifying the identity of the user as being associated with the account and is authorized to request the sharing of provisioning information, and/or verifying that the user is in possession of a card associated with the account. If the confirmation response is positive and the response is positively authenticated, the administrator data processor may transmit, at S290, the account provisioning information to one or more of the account processing systems. In typical embodiments, the information will be transmitted to all of the set of account processing systems for partner administrators having an account for the account holder. In some embodiments, the information will be transmitted only to those account processing systems explicitly approved or identified by the account holder.

The present invention provides automated methods by which an account administrator can securely push account provisioning information and user data to multiple account processing entities without the need for the account holder to repeatedly switch applications, authenticate, or log into the processing systems for the different entities. This is accomplished through the use of a shared encryption/hashing algorithm and/or unique encryption keys, which allows the primary account administrator and partner account processing entities to identify account holders they have in common without sharing account information. This establishes the basis for secure transmission of primary account provisioning information for a particular primary account holder from the primary account administrator to those partner entities also having an account for that primary account holder. This greatly improves the security and efficiency of the sharing operation as well as the convenience to the account holder.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A method for broadcasting provisioning information to multiple account processing systems, the method comprising:
   transmitting, by an administrator data processor to a plurality of account processing systems, user datum encryption information;
   receiving, by the administrator data processor from a user device associated with an account holder having a user account administrated by the administrator data processor, a request to share account provisioning information associated with the account holder;
   encrypting, by the administrator data processor, a user datum associated with the account holder using the user datum encryption information;
   transmitting, by the administrator data processor to each of the plurality of account processing systems, a user account query including the encrypted user datum;
   receiving, by the administrator data processor from at least one of the plurality of account processing systems, a response comprising a notification that the account holder has a transaction account processed by that account processing system;
   transmitting, by the administrator data processor to the user device, a message comprising a request for confirmation that the account provisioning information should be shared with the at least one of the plurality of account processing systems;
   receiving, by the administrator data processor from the user device, a confirmation response including permission to share account provisioning information; and
   transmitting, by the administrator data processor to one or more of the at least one of the plurality of account processing systems, the account provisioning information.

2. A method according to claim 1 further comprising:
   transmitting, by the administrator data processor to the user device, a confirmation authentication request;
   receiving, by the administrator data processor from the user device, at least one authentication credential; and
   authenticating the confirmation response by the administrator data processor using the at least one authentication credential and a predetermined authentication process,
   wherein the action of transmitting the account provisioning information is carried out only in response to a positive authentication of the confirmation response.

3. A method according to claim 2 wherein
   the user account is a contactless card account, and
   the at least one authentication credential includes encrypted information received by the user device from a contactless card associated with the contactless card account.

4. A method according to claim 2 wherein the at least one authentication credential includes multi-factor information associated with the user account.

5. A method according to claim 1 wherein the user datum is one of the set consisting of a phone number and an email address.

6. A method according to claim 1 wherein
   each of the account processing systems is associated with a merchant,
   the user account is a contactless card account, and
   the account provisioning information includes contactless card account information for use in carrying out account holder transactions processed by the account processing systems.

7. A method according to claim 1 wherein the request for confirmation includes an instruction to display a list of the at least one of the plurality of account processing systems.

8. A method according to claim 7 wherein the confirmation response includes permission to share account provisioning information with a subset of the at least one of the plurality of account processing systems.

9. A method according to claim 8 wherein the one or more of the at least one of the plurality of account processing systems includes only members of the subset identified in the confirmation response.

10. An automated system for broadcasting provisioning information to multiple account processing systems, the system comprising:
    a datum encryption data processor configured to generate user datum encryption information, and
        transmit the user datum encryption information to a plurality of account processing systems;
    a user account identification data processor configured to
        receive, over a first network from a user device associated with an account holder having a user account, a request to share account provisioning information associated with the account holder,
        encrypt a user datum associated with the account holder using the user datum encryption information,
        transmit, over a second network to each of the plurality of account processing systems, a user account query including the encrypted user datum, and
        receive, over the second network from at least one of the plurality of account processing systems, a response comprising a notification that the account holder has a transaction account processed by that account processing system;
    a user confirmation data processor configured to
        transmit, to the user device over the first network, a message comprising a request for confirmation that the account provisioning information should be shared with the at least one of the plurality of account processing systems, and receive, from the user device over the first network, a confirmation response including permission to share account provisioning information; and a provisioning information broadcast data processor configured to transmit, over the second network, the account provisioning information to one or more of the at least one of the plurality of account processing systems.

11. A system according to claim 10 further comprising:

a confirmation authentication data processor configured to, responsive to the user confirmation data processor receiving a confirmation response including permission to share account provisioning information, transmit, to the user device over the first network, a confirmation authentication request, receive, from the user device over the first network, at least one authentication credential, and authenticate the confirmation response using the at least one authentication credential and a predetermined authentication process, wherein the provisioning information broadcast data processor is configured to transmit the account provisioning information only in response to a positive authentication of the confirmation response by the confirmation authentication processor.

12. A system according to claim 11 wherein the user account is a contactless card account, and the at least one authentication credential includes encrypted information received by the user device from a contactless card associated with the contactless card account.

13. A system according to claim 11 wherein the at least one authentication credential includes multi-factor information associated with the user account.

14. A system according to claim 10 wherein each of the account processing systems is associated with a merchant, the user account is a contactless card account, and the account provisioning information includes contactless card account information for use in carrying out account holder transactions processed by the account processing systems.

15. A system according to claim 10 wherein the user datum is one of the set consisting of a phone number and an email address.

16. A system according to claim 10 wherein the request for confirmation includes an instruction to display a list of the at least one of the plurality of account processing systems.

17. A system according to claim 16 wherein the confirmation response includes permission to share account provisioning information with a subset of the at least one of the plurality of account processing systems.

18. A system according to claim 17 wherein the one or more of the at least one of the plurality of account processing systems includes only members of the subset identified in the confirmation response.

19. A non-transitory, computer readable medium comprising instructions that, when executed on a data processing system, perform actions comprising:

transmitting, to a plurality of account processing systems, user datum encryption information;

receiving, from a user device associated with an account holder having a user account, a request to share account provisioning information associated with the account holder;

encrypting a user datum associated with the account holder using the user datum encryption information;

transmitting, to each of the plurality of account processing systems, a user account query including the encrypted user datum;

receiving, from at least one of the plurality of account processing systems, a response comprising a notification that the account holder has a transaction account processed by that account processing system;

transmitting, to the user device, a message comprising a request for confirmation that the account provisioning information should be shared with the at least one of the plurality of account processing systems;

receiving, from the user device, a confirmation response including permission to share account provisioning information; and transmitting the account provisioning information to one or more of the at least one of the plurality of account processing systems.

20. A computer readable medium according to claim 19 further comprising instructions that, when executed on a data processing system, perform actions comprising:

transmitting, to the user device, a confirmation authentication request;

receiving, from the user device, at least one authentication credential; and authenticating the confirmation response using the at least one authentication credential and a predetermined authentication process, wherein the action of transmitting the account provisioning information is carried out only in response to a positive authentication of the confirmation response.

* * * * *